United States Patent [19]

Flake

[11] 4,229,223

[45] Oct. 21, 1980

[54] GYPSUM WITH RESIN BINDER

[75] Inventor: Duane W. Flake, Sandy, Utah

[73] Assignee: Mary W. White, Murray, Utah ; a part interest

[21] Appl. No.: 33,961

[22] Filed: Apr. 27, 1979

[51] Int. Cl.² .............................................. C04B 21/00
[52] U.S. Cl. ...................................... 106/88; 106/116
[58] Field of Search .......................... 106/86, 88, 116; 260/29.6 S

[56] References Cited

U.S. PATENT DOCUMENTS

| | | | |
|---|---|---|---|
| 3,758,319 | 9/1973 | Ergene | 106/88 |
| 4,077,809 | 3/1978 | Plunguian et al. | 106/88 |
| 4,137,198 | 1/1979 | Sachs | 260/29.6 S |

*Primary Examiner*—James Poer
*Attorney, Agent, or Firm*—Mallinckrodt & Mallinckrodt

[57] ABSTRACT

A building material prepared by combining a cementitious slurry with an uncured foamed resin and allowing the mixture to cure and harden. The resulting product is primarily cementitious material held in position with a hardened resin binder.

6 Claims, No Drawings

GYPSUM WITH RESIN BINDER

BACKGROUND OF THE INVENTION

This invention relates to a cementitious building material that is self sustaining. More particularly, this invention relates to a cementitious building material that is hardened by means of a cured resinous material.

Gypsum is a white or yellowish-white mineral having the chemical formula $CaSO_4.XH_2O$ and is widely used in its hydrated or calcined (non-hydrated) form as a filler for paints and candies, as a fertilizer, as an additive to soften portland cement, as plaster of Paris and for making plasterboard and wallboard.

When used for making plaster-or wallboard the gypsum is so soft that is must be contained between heavy sheets of paper.

Other cementitious material include portland cement, plasters, mortars and carbonates (limes), and combinations of the same with or without fillers. These materials are often too heavy to be used practically as prefabricated building materials.

Foamed plastics are known to have excellent insulative properties and are known to have been used in the form of foamed panels in the making of prefabricated building. When used for this purpose a structure having inner and outer walls is first constructed and the plastic is then foamed into the interior space between the wall.

Due to the relative softness of gypsum, the weight of other cementitious materials and the characteristic properties of foamed resins, such as urea-formaldehyde, phenol formaldehyde, polyurethane and polystyrene foams, they have not proven suitable in and of themselves as prefabricated building materials but have required that outer coverings or walls be present.

OBJECTS AND BRIEF DESCRIPTION OF THE INVENTION

It is an object of the present invention to provide a cementitious material that is strong, lightweight and which may be prefabricated for use as a building material.

It is also an object of the present invention to provide a cementitious building material having excellent strength and insulative properties which can be cut with a saw, carved or otherwise shaped and which can be combined with structural supports such as wood or steel.

Another object of the present invention is to provide a cementitious building material which can be utilized in panel or board form in the rapid construction of buildings.

These and other objects may be accomplished by means of a cementitious product consisting of a finely divided cementitious material combined with a foamed resin binder. Preferably a slurry is formed consisting of the desired proportions of water and the cementitious material. The slurry is then combined with a major proportion of an aqueous resinous foam and mixed. The slurry-foam mixture is cast into molds and allowed to cure and harden. The resulting product is a hard, relatively lightweight material which may, in most circumstances, be cut, carved, drilled or otherwise treated and is self sustaining for use as a building material.

DESCRIPTION OF THE INVENTION

This invention unexpectedly provides properties in building materials which are superior to either cementitious materials or foamed resins when used separately.

Any variety of polymers which can be produced as a foam may be used in the present invention. Vinyl polymers such as polystyrene and copolymers such as the urethanes are readily available. However, because of their added strength, condensation polymers of an aldehyde with an aromatic alcohol, an amine or an amide are preferred. These products are classified as thermosetting resins and upon curing or heating form an infinite network of interconnected polymeric chains which result in a very strong rigid material. While originally these products required heating to cure or set they can now be made with promoters for ambient temperature curing. Polymers belonging to this group are many and varied. Principal polymers include phenol-formaldehyde, urea-formaldehyde and melamine-formaldehyde resins.

Because the urea-formaldehyde resins are preferred the invention will be described in terms of this class of resins. However, such description does not preclude the use of other foamed resins.

Uncured urea-formaldehyde resins are available in powder or liquid form which contain promoters and are soluble in water. The resin is mixed with water at ambient temperatures in a weight ratio of resin to water of about 1:1 to 1:2 and let stand for a period of several hours or overnight. The resin is them further diluted with water such that a 55 gallon drum of water will contain approximately 80 to 120 lbs. of resin with about 100 lbs. being preferred. The concentration of resin will therefore vary between about 15 and 25%.

A frothing or foaming solution is prepared consisting of approximately a 1 to 3% solution of a detergent. Any suitable detergent may be used whether non-ionic, anionic or cationic. Most commonly anionic detergents of the sulfonate type are employed.

The water used in making the detergent solution must contain calcium or magnesium ions. In other words, hard water is used. This increases the surface tension of the froth or foam bubbles when formed thereby providing a better quality foam and resulting building product.

In preparing the foamed resin the detergent solution is mixed with air to form a froth which is then mixed with the resin. The weight ratio of detergent solution to resin solution is approximately 1:1 but may vary from 0.5:1 to 1.5:1. The entrapped air in the detergent and the surface tension of the froth causes the mixed resin-detergent mixture to be in the form of a foam which is about 85 to 95% water and 5–15% resin.

A cementitious slurry, described herein in terms of a gypsum slurry, is prepared preferably using a calcined gypsum, by mixing a weight ratio of about 0.75:1 to 1.25:1 and preferably about 1:1 gypsum to water. The resulting slurry is then combined with the urea-formaldehyde foam in a volumetric ratio of foam to slurry of about 0.5:1 to 6:1 with a ratio of about 2:1 being preferred. This mixture of foam and slurry is case or poured into molds and allowed to cure or harden. An initial set occurs after only 3 to 5 minutes and the product is completely cured and ready for use after a period of about 2 to 10 days depending upon temperature. Temperatures in excess of 80° F. are preferred and minimize the curing time.

The dried product will consist of about 0.5 to 15% by weight resin with the remainder being the cementitious material or a combination of cementitious and a filler.

Various fillers less heavy than the cementitious materials may be used to provide a lighter product which still has excellent strength and insulative properties. Suitable materials include perlite, diatoms, cinders, pumice, glass bubbles, fibers and the like. An extender may be substituted for up to 60% by volume of the cementitious material if desired.

The procedure used for forming the cementitious material resin mixture preferably utilizes mixing lines along which the various ingredients are moved by pressure or mechanical means. One line contains the detergent solution. Means on the line serves to introduce air into the line in such a manner that a frothy solution of entrapped air is produced. Feeding means meter correct proportions of detergent froth and resin solution into a common line where the resin foam is formed. Resin foam and the cementitious slurry are metered from their respective lines into a common line where thorough mixing takes place. The entrapped air from the foam, while reduced in volume by as much as 6 to 8 times, creates air pockets in the foam-slurry mixture. Because of these air pockets the mixed product has a large surface area which aids in the drying and curing of the resin once it has been poured or cast into a mold. The cured product will generally be in the form of boards or panels having a thickness of from 0.5 to ten inches and a density of between about 12 and 56 lbs/ft$^3$ depending upon the foam to slurry ratio and the amount of fillers or extenders in the cementitious material. In general, panels having a density of from about 24 to 44 lbs/ft$^3$ are preferred.

The panels, while strong and self supporting, are not meant to provide structural or load bearing strength to a building. Rather, the panels or board like strips can be combined with metal or wood supports and utilized in conventional building systems. Preferably the panels or boards are combined with a support system and assembled as described in copending patent application Ser. No. 33,962, filed Apr. 27, 1979, entitled "Method and Apparatus for Constructing Studless Walls".

The products formed by this invention can also be cast or formed into other shapes for use as containers, furniture and similar other purposes. When using high ratios of foam to cementitious material the products are especially useful as insulating materials and will not shrink as is often the case with foams alone.

It will generally be advantageous to cover the building materials of this invention with a sealant or coating. These may be applied by spraying the formed material or by applying a cementitious plaster to the materials when assembled into a building structure.

The following examples are illustrative of the invention.

EXAMPLE 1

A 2% detergent solution was made by combining sufficient amounts of mono lauryl sulfonate with hard water. A resin solution was prepared by adding 98 lbs of an uncured, promoted urea-formaldehyde resin to about 20 gallons of hard water and letting stand overnight and then diluting the resulting mixture to 55 gallons. A gypsum slurry was prepared by mixing equal weights of a calcined gypsum and hard water. All of the above mixtures were prepared and maintained at ambient temperatures.

The detergent solution was aerated in a mixing line and metered through a mixing valve with equal volumetric amounts of the urea-formaldehyde solution into a common feed line as a foam. The resin foam thus formed was metered through a second mixing valve where it was combined with the gypsum slurry at a volumetric ratio of foam to slurry of 2:1. The combined slurry-resin foam mixture was poured into strips about 2"×6"×8' and allowed to cure and set at ambient temperature for four days. The resulting product had a resin content of about 2.2 percent, a density of about 32 lbs/ft$^3$ and could be cut, sawed, drilled and otherwise handled as a building material.

EXAMPLE II

The procedure of Example 1 was followed utilizing a phenolformaldehyde resin. The gypsum contained about 25 percent by volume of an expanded perlite filler. The cured product had a resin content of about 3.5 percent, a density of about 25.5 lbs/ft$^3$ and was comparable to that made in Example I.

EXAMPLE III

The procedure and materials of Example I was followed except that the ratio of resin foam to gypsum slurry was increased to 6:1. The resulting product had a resin content of about 10 percent, a density of about 12 lbs/ft$^3$. This material was easier to cut and was not as strong as the product made in Example I but provided to be an excellent insulating material.

EXAMPLE IV

The procedure of Example I was again followed using a Melamine-formaldehyde resin and had a resin foam to gypsum slurry ratio of 0.5:1. The product formed had a resin content of only about 0.2 percent and had a density of about 42 lbs/ft$^3$. The product was strong but somewhat more brittle than the product of Example 1.

EXAMPLE V

A product was prepared by again following the procedure and proportions of Example 1 utilizing a portland cement in place of gypsum. The resin-cement combination contained about 1 percent resin and had a density of about 52 lbs/ft$^3$. The curing time was extended to six days. The final product was more difficult to cut than that formed in Example 1 but was stronger.

The above examples serve to illustrate certain preferred embodiments of the invention but it is not intended that the scope of the invention be limited to the embodiment shown. Obviously many variations are possible. For example, mixtures of cementitious materials could be used as could combinations of resins, fillers and the like. The invention is limited only by the scope of the appended claims and equivalents thereof.

I claim:

1. A building material formed from the combination and curing of a hard water slurry of a cementitious material and hard water detergent containing resinous foam wherein the resin is selected from the group consisting of urea-formaldehyde, phenol-formaldehyde and melamine-formaldehyde resins and consisting of about 99.5 to 85 percent of said cementitious material intimately combined with from about 0.5 to 15 percent by weight of said foamed resin and also containing calcium and magnesium ions from said hard water and detergent from said resinous foam.

2. A building material according to claim 1 having a density of between about 12 and 56 lbs/ft$^3$.

3. A building product according to claim 2 wherein the cementitious material contains a filler.

4. A building product according to claim 2 wherein the cementitious material is gypsum.

5. A building product according to claim 4 wherein the resin is a foamed urea-formaldehyde resin.

6. A method of preparing a building material consisting of a cementitious material intimately combined with a foamed resin comprising the steps of, (a) preparing an aqueous resin with hard water, having a resin concentration of about 15 to 25 weight percent, (b) preparing a detergent solution with hard water having a detergent concentration of about 1 to 3 weight percent, (c) preparing a slurry by mixing a finely divided cementitious material with water wherein the weight ratio of cementitious material to water is about 0.75:1 to 1.25:1, (d) combining the aqueous resin solution and detergent solutions wtih aeration at a detergent to resin solution ratio of 0.5:1 to 1.5:1 thereby forming a resin foam, (e) intimately combining the resin foam with the cementitious material slurry at a volumetric ratio of foam to slurry of about 0.5:1 to 6:1 to form a foam slurry mixture and, (f) placing said foam slurry in a mold until cured.

* * * * *